March 15, 1938.        T. A. BYERS        2,111,088

SECTIONAL GEAR

Filed Nov. 25, 1936

INVENTOR.
Thomas A. Byers
BY
Glenn L. Fish
ATTORNEY.

Patented Mar. 15, 1938

2,111,088

UNITED STATES PATENT OFFICE 2,111,088

SECTIONAL GEAR

Thomas A. Byers, Spokane, Wash.

Application November 25, 1936, Serial No. 112,780

1 Claim. (Cl. 74—451)

This invention relates to a gear of the sectional type, and one object of the invention is to provide a gear consisting of companion sections so constructed that they may be applied to each other about a shaft and firmly secured to each to form a complete gear which may be fixed to the shaft to turn with the same.

Another object of the invention is to so form the gear sections that when they are applied to each other about a shaft they will have relatively large portions overlapped at opposite sides of the shaft and very firmly secured to each other when securing bolts are passed through the overlapped portions.

Another object of the invention is to so form the gear that while the sections thereof may be disposed about a shaft and then secured to each other, the resulting gear will be very strong and not liable to break or come apart.

The invention is illustrated in the accompanying drawing, wherein

Figure 1:
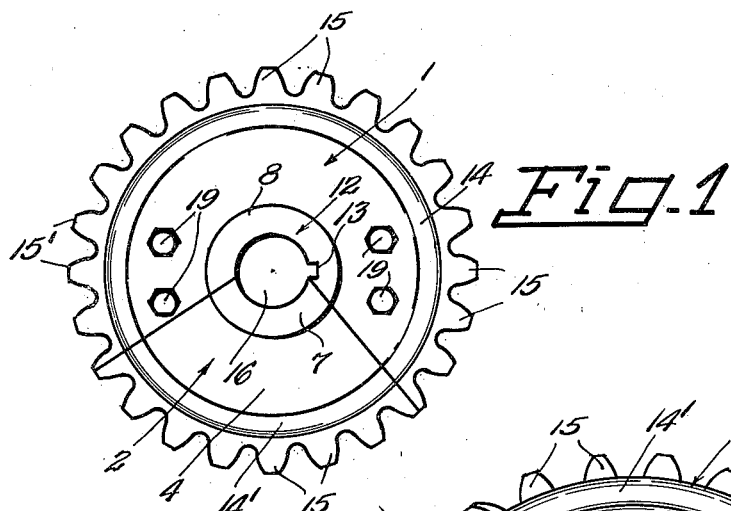
Figure 1 is a view in side elevation of the assembled gear.
Figure 2:
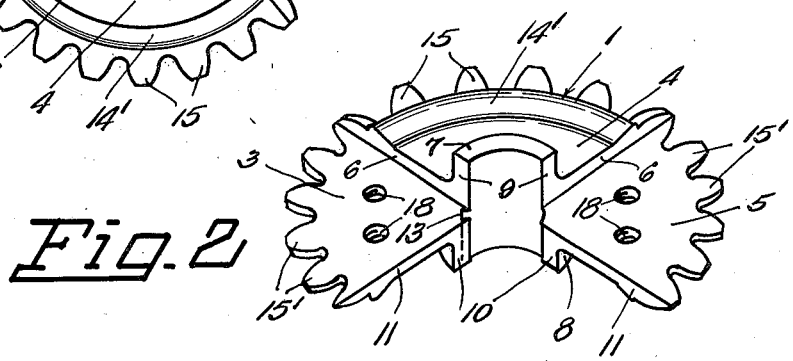
Figure 2 is a perspective view of one section of the gear.
Figure 3:
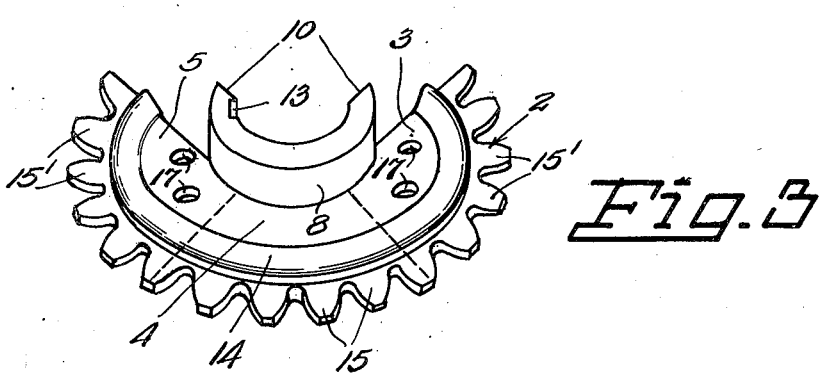
Figure 3 is a perspective view of the other gear section.

This improved gear consists of companion sections 1 and 2 which are of duplicate construction and adapted to be secured in contacting and interfitting engagement with each other to provide a gear of uninterrupted formation, as shown in Figure 1. Each of the gear sections is formed as shown in Figures 2 and 3 and consists of a single casting having segmental portions 3, 4 and 5, the two portions 3 and 5 being of half the thickness of the portion 4 and formed with flat inner side faces, as shown in Figure 2, bordered by shoulders 6 defined by side edge faces of the intermediate portion 4. Arcuate flanges 7 and 8 project from opposite side faces of the gear section with their side edge faces 9 and 10 flush with the shoulders 6 and the edge faces 11 of the gear section, and by referring to Figure 2 it will be seen that the edge faces 9 of the flange 7 are off set from the edge faces 10 of the flange 8 circumferentially of the inner periphery of the gear section so that when the two gear sections are assembled with their segmental portions 3 and 5 in face to face engagement with each other, the flanges may have their edge faces 9 and 10 in face to face engagement with each other and the flanges cooperate with each other to provide a hub 12 for the gear to receive the shaft to which the gear is applied. An internal groove 13 is formed in each flange 10 and when the two gear sections are secured to each other, these grooves register in end to end relation to each other to provide a keyway through which a key may be passed to secure the gear in a fixed position upon a shaft and prevent turning of the gear and the shaft relative to each other. Annular ribs 14 and 14' are provided at opposite sides of the gear sections to reinforce marginal portions of the gear and externally of the reinforced marginal portions of the gear sections are formed with gear teeth 15 and tooth sections 15' which cooperate with each other to provide the gear with a continuous set of teeth about its periphery when the two gear sections are secured to each other.

When this gear is in use, the two sections are disposed about a shaft and moved into position to dispose the portions 3 and 5 in overlapped and face to face engagement with each other. When the gear sections are so disposed, the flanges 9 and 10 cooperate with each other to provide a hub 12 having a bore 16 through which the shaft extends and the edge faces 11 of the gear sections bear against the shoulders 6. Openings 17 and 18 which are formed through the segmental portions 3 and 5 register with each other and screws 19 are passed through the openings 17 and screwed into the openings 18 to securely but releasably hold the two gear sections in cooperating relation to each other. A key is then driven through the keyway formed by the grooves 13 and the gear will be held in a fixed position upon the shaft. When it is desired to remove the gear from the shaft it is merely necessary to unscrew the screws 19 and the two gear sections will be released from each other and can be withdrawn from engagement with each other. It will thus be seen that a number of the improved gears can be applied to a shaft and one or more of the gears removed without disturbing the other gears and also that additional gears may be applied to the shaft without removing gears already in place thereon.

While this invention has been described as a gear or sprocket, it is to be understood that it is not confined to such a device as pulleys and the like can be formed in accordance with the improved construction.

Having thus described the invention, what is claimed as new is:

A sectional gear comprising companion sections of duplicate formation having outer peripheral edges formed with teeth, each section being arcuate and having a segmental intermediate portion thickened from one side and segmental end portions corresponding in dimensions to the intermediate portion but being of half the thickness of the intermediate portion, the segmental end portions having flat and unobstructed inner faces bordered along their inner side edges by shoulders extending substantially radially of the section and defined by inwardly converging side edge faces of the thick intermediate portion, the outer faces of the end portions being flush with the corresponding faces of the intermediate portion, the said intermediate portion having arcuate flanges along its inner peripheral edge projecting laterally from opposite side faces of the section for cooperating with the corresponding flanges of the other section to provide a shaft encircling hub when the sections are assembled, the flange projecting from one side of the said section having its end edge faces flush with side edge faces of the intermediate portion and offset circumferentially of the section from end edge faces of the flange projecting from the other side of the section, said sections when assembled having their segmental portions disposed in overlapped relation to each other with their flat inner faces contacting and the side edge faces of each section abutting the shoulders of the other section, registering openings being formed through the overlapped end portions of the sections, and fasteners secured through the registering openings to detachably hold the sections together.

THOMAS A. BYERS.